United States Patent
Snel et al.

(10) Patent No.: US 9,664,774 B2
(45) Date of Patent: May 30, 2017

(54) METHOD OF CONTROLLING A PLURALITY OF MOBILE TRANSCEIVERS SCATTERED THROUGHOUT A TRANSCEIVER FIELD, AND SYSTEM

(71) Applicants: Roel Ryan Snel, Arnhem (NL); Johannes Jasper Boom, Arnhem (NL)

(72) Inventors: Roel Ryan Snel, Arnhem (NL); Johannes Jasper Boom, Arnhem (NL)

( * ) Notice: Subject to any disclaimer, the term of this patent is extended or adjusted under 35 U.S.C. 154(b) by 0 days.

(21) Appl. No.: 14/432,055

(22) PCT Filed: Sep. 27, 2013

(86) PCT No.: PCT/NL2013/050692
§ 371 (c)(1),
(2) Date: Mar. 27, 2015

(87) PCT Pub. No.: WO2014/051432
PCT Pub. Date: Apr. 3, 2014

(65) Prior Publication Data
US 2015/0241550 A1  Aug. 27, 2015

(30) Foreign Application Priority Data

Sep. 28, 2012 (NL) ...................................... 2009537

(51) Int. Cl.
*G01S 5/02* (2010.01)
*H05B 37/02* (2006.01)
(Continued)

(52) U.S. Cl.
CPC .......... *G01S 5/0289* (2013.01); *H04B 1/3827* (2013.01); *H04W 4/008* (2013.01); *H04W 72/0446* (2013.01); *H05B 37/0272* (2013.01)

(58) Field of Classification Search
CPC . A63F 9/24; G01S 5/02; G01S 5/0289; G06F 15/16; G06K 7/10; H04B 1/28;
(Continued)

(56) References Cited

U.S. PATENT DOCUMENTS 6,002,344 A * 12/1999 Bandy .................. G06K 7/0008
340/10.2
6,469,618 B1 * 10/2002 Gaultier ............... G06K 7/0008
340/10.1
(Continued)

FOREIGN PATENT DOCUMENTS

CN       101561487 B     7/2011
WO    WO-2014051432 A1   4/2014

OTHER PUBLICATIONS

"International Application Serial No. PCT/NL2013/050692, International Search Report mailed Dec. 18, 2013", 3 pgs.
(Continued)

*Primary Examiner* — Shawkat M Ali
(74) *Attorney, Agent, or Firm* — Schwegman Lundberg & Woessner, P.A.

(57) ABSTRACT

Embodiments include a method comprising providing a primary transceiver, and a plurality of secondary transceivers spatially distributed throughout a transceiver field; and executing a setup-routine comprising a wave-routine including: the primary transceiver transmitting a cascading identification command to at least one initial secondary transceiver, wherein the identification command holds instructions for the secondary transceiver to short-range retransmit a same or modified copy of the identification command indiscriminately to neighbouring secondary receivers, provided no such retransmission of the identification command was effected during a wave period immediately preceding reception of the identification command by the secondary transceiver, so as to effect a travelling wave of secondary transceivers retransmitting the identification command.

19 Claims, 4 Drawing Sheets

(51) Int. Cl.
  *H04B 1/3827* (2015.01)
  *H04W 4/00* (2009.01)
  *H04W 72/04* (2009.01)

(58) Field of Classification Search
  CPC ......... H04B 1/38; H04B 1/3827; H04M 1/00;
       H04M 3/42; H04Q 5/22; H04Q 7/00;
       H04W 4/00; H04W 4/02; H04W 4/008;
       H04W 72/04; H04W 72/0446; H05B
       37/00; H05B 37/0272
  USPC ................ 340/10.3, 10.31, 825.54; 362/205;
       375/219, 295, 316; 455/333, 456.3, 572;
       463/42; 709/248
  See application file for complete search history.

(56) References Cited

U.S. PATENT DOCUMENTS

| | | | | |
|---|---|---|---|---|
| 6,724,297 | B1* | 4/2004 | Vacherand | G06K 7/0008 340/10.3 |
| 7,379,713 | B2* | 5/2008 | Lindstedt | H04B 5/02 327/564 |
| 7,899,407 | B2 | 3/2011 | Rofougaran | |
| 2002/0130766 | A1* | 9/2002 | Hulvey | G06K 7/0008 340/10.31 |
| 2003/0017823 | A1 | 1/2003 | Mager et al. | |
| 2008/0198794 | A1* | 8/2008 | Fields | H04H 20/02 370/328 |
| 2008/0274712 | A1* | 11/2008 | Rofougaran | H01P 1/20372 455/333 |
| 2009/0315685 | A1* | 12/2009 | Bauchot | G01S 5/0289 340/10.41 |
| 2011/0019562 | A1* | 1/2011 | Cattuto | G01S 5/0252 370/252 |
| 2011/0057583 | A1 | 3/2011 | Fattizzi | |
| 2012/0165100 | A1 | 6/2012 | Lalancette et al. | |
| 2014/0155098 | A1* | 6/2014 | Markham | H04B 1/0064 455/456.3 |
| 2015/0085903 | A1* | 3/2015 | Gundel | H05K 1/0239 375/219 |

OTHER PUBLICATIONS

"Chinese Application No. 201380062265.8, First Search Jun. 16, 2016", in English, 2 pgs.

\* cited by examiner

| T1 | T2 | T3 | T4 | T5 | T6 | T7 | T8 |
|---|---|---|---|---|---|---|---|
| 253 | 201 | 235 | 219 | 234 | 248 | 246 | 221 |
| | 222 | 250 | 223 | 214 | 244 | 243 | 207 |
| | 231 | 210 | 209 | 251 | 247 | 204 | |
| | 211 | 217 | 240 | 203 | 205 | 254 | |
| | 237 | 202 | 249 | 252 | 228 | 212 | |
| | 233 | 218 | | 220 | 206 | 232 | |
| | 213 | 229 | | 238 | 236 | 230 | |
| | | 241 | | 242 | 208 | | |
| | | 223 | | 224 | 227 | | |
| | | 216 | | 245 | 215 | | |
| | | 226 | | 239 | | | |

*Fig. 2A*

| T1 | T2 | T3 | T4 | T5 | T6 |
|---|---|---|---|---|---|
| 251 | 203 | 242 | 250 | 201 | 217 |
| | 238 | 214 | 233 | 222 | 225 |
| | 245 | 220 | 210 | 235 | 234 |
| | 248 | 249 | 202 | 209 | 252 |
| | 219 | 205 | 211 | 228 | 224 |
| | 239 | 236 | 237 | 232 | 243 |
| | | 241 | 213 | 254 | 246 |
| | | 223 | 253 | 207 | 221 |
| | | 216 | 231 | 212 | |
| | | 229 | 240 | 204 | |
| | | 244 | 226 | 230 | |
| | | 218 | 206 | | |
| | | | 227 | | |
| | | | 247 | | |
| | | | 208 | | |
| | | | 215 | | |

*Fig. 2C*

| T1 | T2 | T3 | T4 | T5 | T6 | T7 |
|---|---|---|---|---|---|---|
| 254 | 232 | 244 | 220 | 209 | 226 | 222 |
| | 245 | 242 | 203 | 229 | 235 | 217 |
| | 221 | 215 | 249 | 240 | 233 | 253 |
| | 207 | 227 | 251 | 234 | 211 | 202 |
| | 208 | 228 | 224 | 225 | 213 | 231 |
| | 212 | 204 | 219 | 216 | 237 | 201 |
| | 247 | 236 | 238 | 223 | 250 | |
| | 230 | 206 | 214 | 241 | 210 | |
| | | 239 | 245 | | 233 | |
| | | 243 | 248 | | 218 | |
| | | 205 | 252 | | | |

*Fig. 2B*

| T1 | T2 | T3 | T4 | T5 | T6 |
|---|---|---|---|---|---|
| 252 | 225 | 235 | 217 | 211 | 202 |
| | 234 | 226 | 222 | 253 | 205 |
| | 224 | 240 | 201 | 214 | 208 |
| | 209 | 215 | 231 | 213 | 229 |
| | | 228 | 223 | 237 | 239 |
| | | 204 | 216 | 219 | 210 |
| | | 212 | 206 | 249 | 230 |
| | | 243 | 227 | 220 | 218 |
| | | | 221 | 250 | 245 |
| | | | 245 | 244 | 248 |
| | | | 207 | 236 | 238 |
| | | | 232 | 242 | 251 |
| | | | 254 | 247 | 203 |

*Fig. 2D*

X-coordinate

| 0.00-0.30 | 0.30-0.60 | 0.60-0.90 | 0.90-1.20 | 1.20-1.50 | 1.50-1.80 | 1.80-2.10 | 2.10-2.40 | 2.40-2.70 | 2.70-3.00 |
|---|---|---|---|---|---|---|---|---|---|
| 201 | 202 | 211 | 216 | 209 | 219 | 248 | 208 | 212 | 207 |
| 222 | 217 | 213 | 223 | 225 | 249 | 244 | 247 | 230 | 221 |
| 231 |  | 233 | 229 | 240 | 239 | 245 | 204 | 232 |  |
| 253 |  | 237 |  | 241 | 251 | 205 | 242 | 254 |  |
|  |  | 210 |  | 234 | 252 | 206 |  |  |  |
|  |  | 218 |  | 239 | 203 | 215 |  |  |  |
|  |  | 226 |  |  | 214 | 227 |  |  |  |
|  |  | 235 |  |  | 220 | 228 |  |  |  |
|  |  | 250 |  |  | 224 | 236 |  |  |  |
|  |  |  |  |  | 238 | 243 |  |  |  |
|  |  |  |  |  |  | 208 |  |  |  |
|  |  |  |  |  |  | 247 |  |  |  |

*Fig. 3A*

Y-coordinate

| 0.00-0.30 | 0.30-0.60 | 0.60-0.90 | 0.90-1.20 | 1.20-1.50 | 1.50-1.80 | 1.80-2.10 | 2.10-2.40 | 2.40-2.70 | 2.70-3.00 |
|---|---|---|---|---|---|---|---|---|---|
| 203 | 205 | 230 | 214 | 253 | 206 | 201 | 204 | 217 | 224 |
| 238 | 218 | 219 | 220 | 216 | 227 | 207 | 212 | 221 | 234 |
| 239 | 229 |  | 236 | 223 | 231 | 222 | 228 | 243 | 246 |
| 248 | 202 |  | 242 | 241 | 233 | 232 | 235 |  | 252 |
| 251 | 208 |  | 244 |  | 215 |  | 209 |  |  |
|  | 210 |  | 249 |  | 226 |  |  |  |  |
|  | 245 |  | 211 |  | 240 |  |  |  |  |
|  |  |  | 213 |  | 225 |  |  |  |  |
|  |  |  | 237 |  | 254 |  |  |  |  |
|  |  |  | 247 |  |  |  |  |  |  |
|  |  |  | 250 |  |  |  |  |  |  |

*Fig. 3B*

METHOD OF CONTROLLING A PLURALITY OF MOBILE TRANSCEIVERS SCATTERED THROUGHOUT A TRANSCEIVER FIELD, AND SYSTEM

PRIORITY APPLICATIONS

This application is a U.S. National Stage Filing being made under 35 U.S.C. §371 from International Application No. PCT/NL2013/050692, filed on 27 Sep. 2013, and published as WO/2014/051432 on 3 Apr. 2014, which application claims the benefit under 35 U.S.C. §119to Netherlands Application No. 2009537, filed on 28 Sep. 2012; which applications and publication are incorporated herein by reference in their entirety.

FIELD OF THE INVENTION

The present invention relates to a method of controlling a plurality Of mobile transceivers scattered throughout a transceiver field. The invention also relates to a system.

BACKGROUND

During a pop concert a crowd of people may gather in a stadium, park or other location. To entertain themselves the people may, for instance, collectively perform a wave. To that end, successive groups of people may briefly standup and/or raise their arms, and, immediately upon stretching to full height, return to their original, typically seated positions.

SUMMARY OF THE INVENTION

Crowd entertainment may be taken to a next level through the use of technology. Individual people may, for instance, be fitted with a transceiver, e.g. an RF transceiver capable of producing audio and/or visual signals and incorporated into a badge or wrist band, which transceivers may be controlled by a remote controller, individually but in an orchestrated fashion, so as to produce coordinated audio and/or visual effects within the crowd. One such effect could be a visual wave of light, which could be created by instructing successive groups of transceivers to briefly light up; other, more intricate audio and/or visual effects are, of course, also possible.

However, a problem in this context is that the positions of the transceivers worn by the individuals in the crowd may not be known a priori, and may not be fixed in time. Hence, even though individual transceivers may be instructed to perform a certain action, e.g. the production of light or sound, it may not be possible to control the plurality of transceivers such that a certain spatial pattern is effected, simply because the positions of the individuals transceivers may be unknown and subject to change.

It is an object of the present invention to provide for a method of controlling a plurality of mobile transceivers scattered throughout a transceiver field, that allows for the determination of the time-variable positions of the transceivers, and for their coordinated control. Optionally, this may be such that, in case the transceivers are fitted with audio and/or visual means, spatial audio and/or visual patterns may be effected.

To this end, an aspect of the present invention is directed to a method. The method may comprise providing a primary transceiver, and providing a plurality of secondary transceivers that are spatially distributed throughout a transceiver field. Each secondary transceiver may include a transmitter, capable of at least one of short-range and long-range transmissions; a receiver, capable of receiving both short-range and long-range transmissions; a memory for holding a unique identification code; and a processing unit, operably connected to the transmitter, the receiver and the memory, and configured to execute commands received via the receiver, The method may further comprise executing a setup-routine, which setup-routine may comprise a wave-routine including the step of the primary transceiver transmitting a cascading identification command to at least one secondary transceiver, wherein the identification command holds instructions for the secondary transceiver to short-range retransmit a same or modified copy of the identification command indiscriminately to neighboring secondary receivers, provided no such retransmission of the identification command was effected during a wave period immediately preceding reception of the identification command by the secondary transceiver, so as to effect a travelling wave of secondary transceivers retransmitting the identification command.

The method may also comprise executing an action-routine, in which the primary transceiver interacts with at least one of the secondary transceivers, selected for its position within the transceiver field, by sending it an action command.

A characteristic of the presently disclosed method is that it employs travelling waves of secondary transceivers executing an identification command to determine the positions of the secondary transceivers present within the transceiver field. Such travelling waves enable accurate and quick determination of the aforesaid positions, and dynamically take account of secondary transceivers that enter and/or leave the transceiver field. The amount of secondary transceivers that may be controlled is virtually endless.

In one embodiment, identification codes are transmitted from the secondary transceivers to the primary transceiver, particularly such that the primary transceiver can process such information to map or estimate the transceiver field positions of the secondary receivers. This is, however, not essential.

In an alternative embodiment, for example, the secondary transceivers are configured to store respective unique identification codes, or position coordinates, themselves during/as a result of carrying out the set-up routine. In other words: the secondary transceivers may be controlled to become aware of their position (e.g. a 2D x,y-coordinate, or a 3D x, y, z coordinate) in a transceiver field/area/space, as a result of execution of the set-up routine that comprises the wave-routine. Particularly, the secondary transceivers may be configured to store their own position (e.g. a 2D x,y-coordinate, or a 3D x, y, z coordinate), the position simply following from execution of the set-up routine that comprises the wave-routine, more particularly in the case that modified identification commands are transmitted between the receivers. Said position can be e.g. an estimated position, or mutual transceiver position, or differently, of the secondary transceiver.

According to a further embodiment, the memory of each secondary transceiver holds a predetermined unique identification code.b2

According to a further embodiment, the identification command holds instructions for the secondary transceiver
- to long-range transmit its identification code to the primary transceiver, and
- to short-range retransmit the identification command indiscriminately to neighboring secondary receivers after a certain time slot delay;

and wherein the wave-routine further includes:
the primary transceiver recording, in a wave table, the identification codes being received during consecutive time slots, each of which time slots (T) covers a time interval corresponding to the time slot delay.

Preferably, the identification command's instruction for the secondary transceiver to long-range transmit its identification code to the primary transceiver includes the instruction to do so after a certain secondary transceiver-specific randomizer delay.

In a further embodiment, the randomizer delay is smaller than the time-slot delay, and wherein the time-slot delay is smaller than the wave period.

According to another preferred embodiment, wherein the identification command holds instructions for the secondary transceiver
to store an iteration number of the received identification command in its memory as part of its unique identification code;
to short-range retransmit the identification command with an incremented iteration number.

In this case, it is not required for the secondary receiver to long-range transmit its identification code to the primary transceiver.

For example, the iteration number can associate the respective transceiver to its actual position in the transceiver field (the transceiver has been taught or 'knows' its own field position). In such a case, a primary transceiver may control secondary receivers by transmitting an action command that includes the iteration number, or unique information that is associated with the iteration number. Then, the secondary transceiver or transceivers that have stored that iteration number may be configured to respond to the receiving of that iteration number, or said unique information associated with that number, by taking corresponding (e.g. pre-programmed) action.

According tom a further embodiment, the setup-routine includes multiple wave-routines associated with different initial secondary transceivers.

For example, according to a further embodiment, the transceiver field (may be associated with two, mutually perpendicular geometric axes ($L_x$, $L_y$). Then, the setup-routine may for example include two wave-routines associated with different initial secondary transceivers that, during execution of the cascading identification command, effect travelling waves having respective generally straight wave fronts, which wave fronts travel in opposite directions along one of said geometric axes.

The setup-routine may also include another two wave-routines associated with different initial secondary transceivers that, during executing of the cascading identification command, effect travelling waves having respective generally straight wave fronts, which wave fronts travel in opposite directions along the other of said geometric axes.

According to an embodiment, at least one of the initial secondary transceivers has a fixed, predetermined position in the transceiver field, for example near or along the circumference of the transceiver field.

According to a further embodiment, the setup-routine further comprises a secondary transceiver mapping-routine, including:
composing a position map of the secondary transceivers within the transceiver field, based on data from the obtained wave tables.

For example, identification codes received during a plurality of early consecutive time slots (T1, T2, T3, . . . ) in each of said multiple wave tables may be discarded in composing the position map.

Optionally, the primary transceiver may includes a plurality of transceivers that have a fixed, predetermined position in the transceiver field, for example along or near a circumference of the transceiver field.

According to a non-limiting embodiment, the secondary transceivers further include audiovisual communication means that are operably connected to the processing unit, and
wherein the action-routine includes:
the primary transceiver determining a desired spatial audio and/or visual pattern, and transmitting an action command to at least one secondary transceiver that is selected based on (i) said spatial audio and/or visual pattern and (ii) either the composed position map or its identification code, wherein the action command holds instructions for the secondary transceiver to activate and/or deactivate the audio and/or visual communication means, so as to effect the desired spatial audio and/or visual pattern within the transceiver field.

Further, according to an aspect of the invention there is provided a system, particularly for carrying out a method according to the invention, the system including:
providing a primary transceiver;
providing a plurality of secondary transceivers, configured to be spatially distributed throughout a transceiver field, each secondary transceiver including:
a transmitter, capable of at least one of short-range and long-range transmissions;
a receiver capable of receiving both short-range and long-range transmissions;
a memory for holding a unique identification code; and
a processing unit, operably connected to the transmitter, the receiver and the memory, and configured to execute commands received via the receiver;
the primary transceiver being configured to transmit a cascading identification command to at least one initial secondary transceiver, wherein the identification command holds instructions for the secondary transceiver to short-range retransmit a same or modified copy of the identification command indiscriminately to neighboring secondary receivers, provided no such retransmission of the identification command was effected during a wave period immediately preceding reception of the identification command by the secondary transceiver, so as to effect a travelling wave of secondary transceivers retransmitting the identification command.

Optionally, the primary transceiver and at least one of the secondary transceivers can be configured to execute an action-routine, in which the primary transceiver interacts with the at least one of the secondary transceivers, selected for its position within the transceiver field, by sending it an action command.

These and other features and advantages of the invention will be more fully understood from the following detailed description of certain embodiments of the invention, taken together with the accompanying drawings, which are meant to illustrate and not to limit the invention.

BRIEF DESCRIPTION OF THE DRAWINGS

FIGS. 2A-D schematically illustrate wave tables composed during wave-routines in which a travelling wave traveled through the transceiver field substantially in the positive X-direction, the negative X-direction, the positive Y-direction, and the negative Y-direction, respectively.

FIG. 3 schematically illustrates a position map comprising two sub-position maps, one for the X-coordinates of the secondary transceivers (FIG. 3A) and one of the Y-coordinates of the secondary transceivers (FIG. 3B).

DETAILED DESCRIPTION

Figure 1:
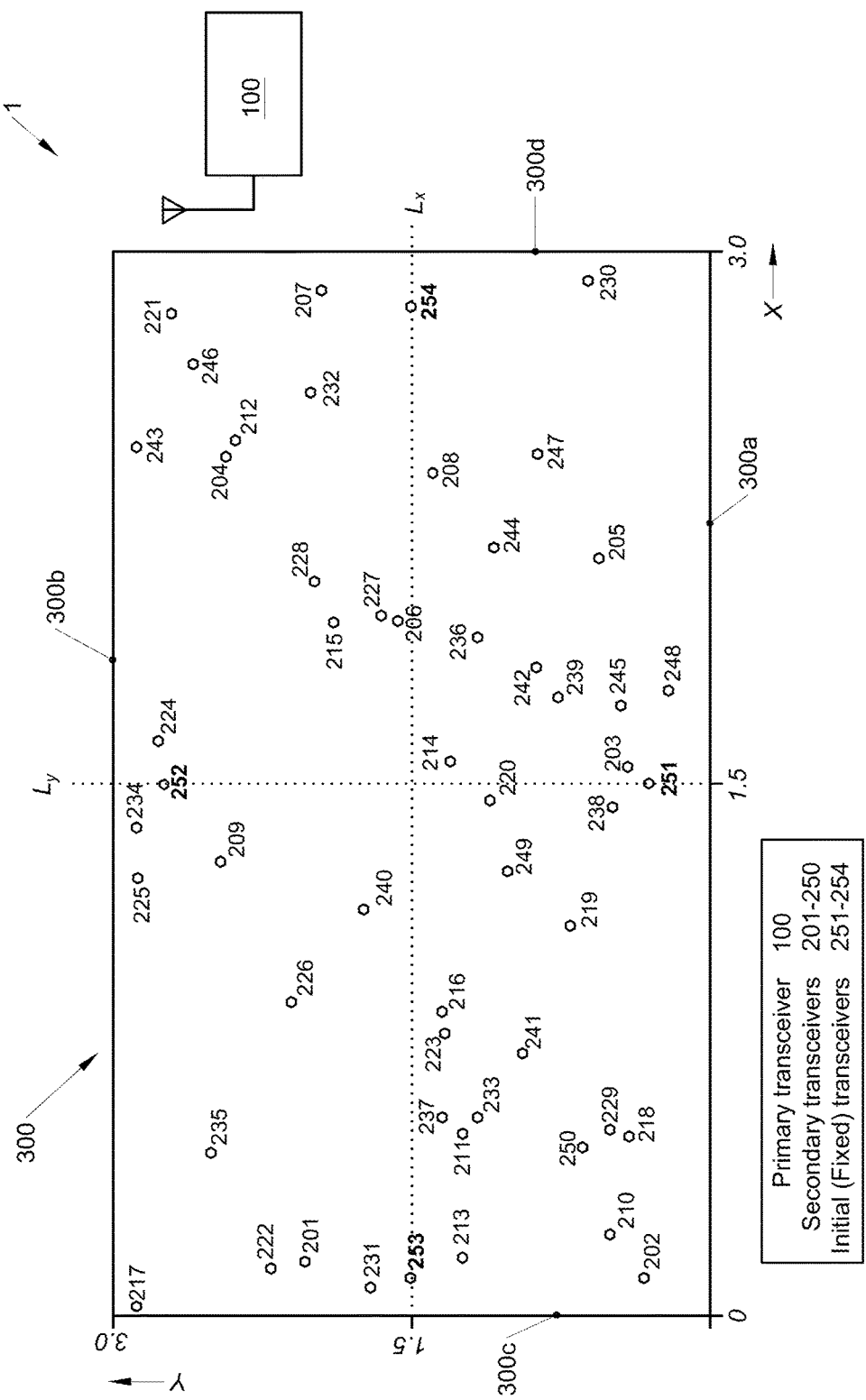
FIG. 1 is a schematic top view of a system, including a primary transceiver and a plurality of secondary transceivers scattered around a transceiver field, suitable for executing the first or the second primary embodiments of the method according to the present invention.

FIG. 1 schematically illustrates a system 1 including a primary transceiver 100 and a plurality of secondary transceivers 201-250. The secondary transceivers 201-250 are scattered around a spatial region hereafter referred to as the transceiver field 300.

The primary transceiver 100 may include at least one, typically stationary or positionally fixed transceiver that may preferably be capable of effecting both long-range and short-range transmissions, and of receiving both long-range and short-range transmissions. In case the primary transceiver 100 includes multiple transceivers (or multiple transmitters and/or receivers), the transceivers (or transmitters and/or receivers) may be mutually spaced apart, for instance within or around the transceiver field 300. The primary transceiver 100 may further include a processor and a memory for executing program instructions and processing data, such as instructions and data relating to a setup-routine and an action routine, as described below.

In an alternative embodiment, the primary transceiver 100 may be a mobile/portable transceiver, e.g. a lightweight transceiver that can be carried without burden by a single person. For example, the primary transceiver 100 may, for instance, be incorporated in a badge, a wristband, a tag, a label, a watch, a garment, a wearable computer or electronic eyewear, e.g. GoogleGlass™, or any other artifact that is attached to (i.e. held or carried by) a person or by an object whose position may change with time, e.g. because the person or object enters, moves through, and/or leaves the transceiver field 300.

According to a further embodiment, the primary receiver may be a portable electronic consumer product (consumer electronics device), for example a telephone, a cell phone (i.e. mobile or cellular telephone), a mobile computer, a laptop, a tablet-computer or a combination of such devices. The primary transceiver 100 may include e.g. a user interface, for example a touch screen, keyboard, voice controlled interface and/or a different type of user interface, for controlling the device 100.

The secondary transceivers 201-250 may typically be mobile transceivers. A secondary transceiver 201-250 may, for instance, be incorporated in a badge, a wristband, a tag, a label, a watch, a garment, a wearable computer or electronic eyewear, e.g. GoogleGlass™ or any other artifact that is attached to (i.e. held or carried by) a person or by an object whose position may change with time, e.g. because the person or object enters, moves through, and/or leaves the transceiver field 300.

According to a further embodiment, one or more of the secondary transceivers 201-250, for example each of the secondary transceivers 201-250, may be a portable electronic consumer product, for example a telephone, a cell phone (i.e. mobile or cellular telephone), a mobile computer, a tablet-computer, a laptop, a touch-pad or a combination of such devices. The secondary transceiver 201-250 may include e.g. a user interface, for example a touch screen, keyboard, voice controlled interface and/or a different type of user interface, for controlling the device 201-250.

In some embodiments, however, one or more secondary transceivers 201-250 may be stationarily fixed in space, in particular within the transceiver field 300.

A secondary transceiver 201-250 may preferably include a transmitter capable of effecting both long-range and short-range transmissions, and a receiver capable of receiving both long-range and short-range transmissions. In addition, a secondary transceiver 201-250 may include a memory for storing a unique identification code, i.e. an identification code that is actually unique, or at least rare, amongst the plurality of secondary transceivers 201-250 of the system 1, and a processing unit that is operably connected to the transmitter, the receiver and the memory, and that is configured to execute commands received via the receiver. A secondary transceiver 201-250 may further comprise action means, such as audio and/or visual means capable of providing audio and/or visual signals to the environment. In one embodiment, the action means may, for instance, include an electroacoustic transducer configured to produce sound in response to an input signal that may be provided by the processing unit, in particular in response to the reception of an action command by the receiver. In another embodiment, the action means may include one or more lights, e.g. (RGB) LEDs, configured to emit light in one or more colors, wherein the pattern in which the light(s) operate(s) may be controlled by the processing unit, possibly in dependence of and in response to an action command received by the receiver.

The system depicted in FIG. 1 schematically illustrates a number of transceivers 251-254 that are provided at fixed positions within the transceiver field 300. In one embodiment of the present invention, in particular in the first primary embodiment to be discussed below, these transceivers 251-254 may be positionally fixed, (initial) secondary transceivers. In another embodiment, in particular in the second primary embodiment to be discussed below, these transceivers 251-254 may be considered to form part of the primary transceiver 100.

Both the primary and the secondary transceivers 100, 201-254 may preferably be Radio Frequency (RF) transceivers, but it is contemplated that transceivers of a different type, e.g. optical and/or acoustic transceivers, may be used as well.

As regards the adjectival terms 'long-range' and 'short-range' as used in relation to effecting and receiving transmissions, it is noted that a distinction between long-range and short-range transmissions may be made based on both operational parameters on the side of the transmitter, e.g. transmit power, and operational parameters on the side of the receiver, e.g. application of a minimum signal strength threshold. For instance, a transceiver's transmitter may short-range transmit by effecting a transmission at a certain transmit power that is lower than the transmit power at which it effects long-range transmissions. Alternatively or in addition, a transceiver's receiver may receive short-range transmissions by applying a signal strength filter or signal strength threshold to incoming transmissions, such that relatively weak receptions—which are assumed to originate from far away—are discarded while relatively strong receptions—which are assumed to originate from nearby—are registered. In one embodiment, the transceivers may additionally or alternatively use predetermined frequencies for short-range and long-range transmissions, respectively. Particularly, the long-range is significantly longer than the short-range, wherein the long range may be a range that covers an entire transceiver field, particularly a field that includes all secondary transceivers that are to be reached, wherein the short-range may be a range that covers can only reach a part of the entire transceiver field. For example, according to a non-limiting embodiment, the short-range transmission may be based on Bluetooth™ technology, e.g. Bluetooth Low Energy (BLE) technology.

The transceiver field 300 may be construed to be the region of space throughout which the secondary transceivers 201-250 are expected to be distributed during operation of the system 1. In principle, the transceiver field 300 may be considered to be a three-dimensional field, such that three independent spatial coordinates may be required to determine the position of a secondary transceiver 201-250 within the transceiver field 300. In many practical applications, however, the transceiver field 300 may be considered to be a two-dimensional field, e.g. a floor area across which the secondary transceivers 201-250 are scattered, such that the position of a secondary transceiver within the transceiver field is determined by two independent spatial coordinates. The three- or two-dimensional space of the transceiver field 300 may have any suitable shape, e.g. a three-dimensional box shape or a two-dimensional rectangular shape. During operation, mobile secondary transceivers 201-250 may typically enter, move through and/or leave the transceiver field 300, such that the presence and position of a secondary transceiver within the transceiver field may vary with time.

Below, two primary embodiments of the method according to the present invention are illustrated. The two embodiments differ in that the first primary embodiment uses secondary transceivers 201-250, 251-254 with predetermined identification codes that are collected by the primary transceiver during a setup-routine, while the second primary embodiment uses secondary transceivers 201-250 whose identification codes are first assigned/determined during the setup-routine.

Referring now to FIGS. 1-3 to illustrate the first primary embodiment of the method according to the present invention.

In this embodiment, each secondary transceiver of the plurality of secondary transceivers 201-254 is assigned a respective unique identification code before the system 1 comes into operation. The identification codes, which may be stored in the memories of the respective secondary transceivers 201-254, may, for instance, be assigned to the secondary transceivers upon manufacture, or be programmed into them upon selection of the plurality of transceivers to be used for the system 1.

FIG. 1 illustrates how a plurality of secondary transceivers 201-254 is scattered around a generally two-dimensional rectangular transceiver field 300, having dimensions of 3.0 by 3.0 in arbitrary units. For ease of exposition, the reference signs used to indicate the secondary transceivers 201-254 correspond to their identification codes. The secondary transceivers 201-250 are mobile transceivers in the sense that their respective positions are expected to vary with time. The respective positions of the secondary transceivers 251-254, on the other hand, are fixed. These positionally fixed secondary transceivers may serve as initial secondary transceivers, i.e. as secondary transceivers to be addressed first by the primary transceiver 100 at the beginning of a respective wave-routine that is part of the setup-routine. Although it is certainly not a necessity to employ positionally fixed initial secondary transceivers 251-254, such secondary transceivers may offer the advantage that travelling waves in a desired direction may be initiated quickly, in particular without the need for the primary transceiver 100 to first identify and locate an initial mobile secondary transceiver 201-250 at a suitable location within the transceiver field 300.

The positions of the positionally fixed initial secondary transceivers 251-254 are chosen strategically at about halfway the edges of the rectangular transceiver field 300. More specifically, the transceiver field 300 may be associated with two, mutually perpendicular geometric axes $L_x$, $L_y$. Each of the axes $L_x$, $L_y$ may run parallel to two respective mutually opposite edges 300a-d of the transceiver field 300, and the two axes $L_x$, $L_y$ may cross one another at the geometric center of the transceiver field 300, such that each of the axes $L_x$, $L_y$ intersects two other respective mutually opposing edges of the transceiver field about halfway. The initial secondary transceivers 251-254 may be positioned at or near these latter points of intersection.

When the system 1 comes into operation, it will first execute a setup-routine. During the setup-routine the primary transceiver 100 may take stock of the secondary transceivers 201-254 present within the transceiver field 300, and determine the respective spatial coordinates reflecting their respective positions within the transceiver field. The spatial coordinates of the secondary transceivers 201-254 within the transceiver field 300 are then stored the primary transceiver's memory in the form of a position map for use by an action routine, to be described infra.

The setup-routine may include a wave-routine. In a typical embodiment, the setup-routine may include multiple wave-routines, namely at least one wave-routine per dimension or independent coordinate to be determined, and in a preferred embodiment, the setup-routine may include two wave-routines per dimension or independent spatial coordinate to be determined. As will become clear below, the use of two wave-routines per dimension enables determination of the positions of the secondary transceivers 201-254 with a greater accuracy than possible with one wave-routine per dimension. For instance, the positions of the respective secondary transceivers 201-254 in the two-dimensional transceiver field shown in FIG. 1 are determined by two spatial coordinates, which may be referred to as X and Y. To accurately determine the X-coordinates of the respective secondary transceivers 201-254, a preferred embodiment may comprise the execution of two wave-routines. The same applies to the determination of the Y-coordinates. Accordingly, four wave-routines may be executed to accurately determine the X- and Y-coordinates of all mobile secondary transceivers 201-254 present within the transceiver field during execution of the setup-routine.

A wave-routine may entail the constitution of a travelling wave, which travelling wave may be initiated by the primary transceiver 100 and then perpetuated by the secondary transceivers 201-254. To initiate a travelling wave, the primary transceiver 100 may select a suitable initial secondary transceiver, for instance a strategically positioned and positionally fixed secondary transceiver 251-254 whose presence in the transceiver field 300 is a given, and transmit a cascading identification command to said selected initial secondary transceiver. The identification command may hold instructions for the secondary transceiver to:

i. to long-range transmit its identification code to the primary transceiver, preferably after a certain secondary transceiver-specific randomizer delay $t_{rand\_delay}$; and ii. to short-range retransmit the identification command indiscriminately to secondary receivers, preferably after a certain $t_{time\_slotdelay}$, and preferably under the condition that no such retransmission of the identification command was effected during a wave period $t_{waveperiod}$ immediately preceding reception of the identification command by the secondary transceiver, so as to effect a travelling wave of secondary transceivers retransmitting the identification command.

The process effected by the transmission of the identification command may be elucidated as follows.

By default, the secondary transceivers 201-254 in the transceiver field 300 may be configured to listen to both long-range and short-range transmitted commands addressed to them. A command may be perceived as addressed to a secondary transceiver 251-254 if the command includes an addressee-field that specifically identifies the secondary transceiver, e.g. by means of its predetermined unique identification code, or if the command does not include an addressee-field or an empty one, in which case the command may be considered to be sent indiscriminately to all secondary transceivers. The initial identification command transmitted by the primary transceiver 100 to a selected initial secondary transceiver 251-254 may typically include a addressee-field that holds an identification of the selected initial secondary transceiver, so that only this secondary transceiver will initially respond by execution of the command.

Once the initial secondary transceiver 251-254 receives the identification command, it will execute it by transmitting its identification code back to the primary transceiver 100. The transmission of the identification code to the primary transceiver 100 may be a long-range transmission to ensure that the primary transceiver is reached. In case the identification command so specifies, the transmission of the identification code to the primary transceiver 100 may be effected after a certain secondary transceiver-specific randomizer delay, e.g. a delay that may be determined by the secondary transceiver 201-254 based on its unique identification code. For instance, a secondary transceiver with identification code x may wait x milliseconds before transmitting its identification code to the primary transceiver 100. Inclusion in the identification command of an instruction to use a secondary transceiver-specific randomizer delay ensures that secondary receivers 201-254 that simultaneously receive the identification command will not simultaneously transmit their identification codes to the primary transceiver 100, which might cause interference between the transmissions and cause some or all transmitted identification codes to become lost.

The initial secondary receiver 251-254 may further retransmit the identification command indiscriminately to neighboring secondary transceivers. As the identification codes of neighboring secondary transceivers are unknown (both to the initial secondary transceiver and to the primary transceiver), the initial secondary transceiver may short-range retransmit the identification command to ensure that only neighboring secondary transceivers are reached.

In case the identification command so specifies, the retransmission of the identification command to neighboring secondary transceivers 201-254 may be effected after a certain time slot delay $t_{time\_slot}$, e.g. a delay on the order of hundreds or thousands of milliseconds. The time slot delay may be non-variable, and have been determined by the primary transceiver 100 upon transmission of the identification command to the initial secondary transceiver. Inclusion in the identification command of an instruction to use a time slot delay, in particular when the time slot delay is chosen greater than the maximum possible secondary transceiver-specific randomizer delay, may ensure that retransmission of the identification command to neighboring secondary transceivers does not interfere with the transmission of identification codes to the primary receivers, and, more importantly, synchronize propagation of the identification command across a wave front of the travelling wave that is being effected. Consequently, it enables the primary transceiver 100 to orderly record the identification codes transmitted to it in a wave table, as will be described below.

In case the identification command so specifies, the retransmission of the identification command to neighboring secondary transceivers may be subject to the condition that no such retransmission of the identification command was effected during a wave period $t_{wave\_period}$ immediately preceding reception of the identification command by the secondary transceiver 201-254. Inclusion in the identification command of an instruction to subject retransmission of the identification command to the lapse of a wave period, in particular when the wave period is chosen greater than the time slot delay, and preferably greater than the time it may take the travelling wave of secondary transceivers 201-254 retransmitting the identification command to reach all secondary transceivers present within the transceiver field 300, may prevent a wave front of the travelling wave from propagating backwards. Such backwards movement of the wave front might cause secondary transceivers 201-254 that have already identified themselves to the primary transceiver to again (and again, and again, . . . transmit their identification code, which is pointless.

It will be clear that the initial transmission of the identification command to a selected initial secondary transceiver 251-254 brings about a travelling wave of secondary transceivers (i) transmitting their identification codes to the primary transceiver, and (ii) retransmitting the identification command. As the travelling wave propagates through the transceiver field 300, the primary transceiver 100 may record, in a wave table, the identification codes being received, in particular during consecutive time slots, each of which time slots may covers a time interval corresponding to the time slot delay encoded in the identification command.

The above-described process and the composition of wave tables may be illustrated with reference to FIGS. 2A-2D.

FIG. 2A illustrates a wave table that was composed during a first wave-routine in which a travelling wave traveled through the transceiver field 300, substantially in the positive X-direction. The travelling wave was initiated at t=0 by the primary transceiver 100 sending the identification command to selected initial secondary transceiver 253, positioned at about halfway the left edge 300c of the transceiver field 300 (note that the initial secondary transceiver 253 was selected because it may be expected to set off a travelling wave that propagates substantially in the positive X-direction). Within a time slot delay $t_{time\_slot\_delay}$ of reception of the identification command, the initial secondary transceiver 253 transmitted its identification code back to the primary transceiver 100 (instruction (i) discussed above), which recorded it as received within a first time slot, i.e. time slot T1, covering the time interval from t=0 to t=$t_{time\_slot\_delay}$. Upon lapse of the time slot delay $t_{time\_slot\_delay}$, the initial secondary transceiver 253 short-range retransmitted the identification command indiscriminately to neighboring secondary transceivers, which, as instructed by the identification command (instruction (ii) discussed above), transmitted their respective identification codes to the primary transceiver 100 within the next time slot delay. As can be seen in the wave table of FIG. 2A, during the corresponding second time slot T2 the primary transceiver 100 recorded the identification codes of secondary transceivers 201, 222, 231, 211, 237, 233, and 213. Comparison of these identification codes with FIG. 1 reveals that these identification codes are indeed associated with secondary transceivers neighboring, i.e. positioned relatively close to, initial secondary transceiver 253. Upon lapse of the second time slot delay, i.e. after a delay $t_{time\_slot\_delay}$ from reception of the identification command by the secondary transceivers 201, 222, 231, 211, 237, 233 and 213, these secondary transceivers again short-range retransmitted the identification command indiscriminately to their neighboring secondary transceivers. The secondary transceivers receiving this latter transmission of the identification command that had not yet transmitted their identification code to the primary transceiver during a wave period $t_{wave\_period}$ immediately preceding the reception of the identification command then transmitted their identification code to the primary transceiver 100, which recorded them as received within time slot T3. As shown in the wave table of FIG. 2A, the secondary transceivers concerned are transceivers 235, 250, 210, 217, 202, 218, 229, 241, 223, 216 and 226. It is understood that the propagation of the travelling wave continued until all secondary transceivers 201-254 present within the transceiver field 300 identified themselves, and the travelling wave completely reached the right edge 300d of the transceiver field 300.

Given the dimensions of the transceiver field 300 and the time it takes a travelling wave to cross it in the positive X-direction, the wave table of FIG. 2A may be construed to provide information about the X-coordinates of the secondary transceivers 201-254. For instance, FIG. 2A reveals that it takes the travelling wave a period of seven times $t_{time\_slot\_delay}$ to travel from the left edge 300c to the right edge 300d of the transceiver field 300 (seven times, because the travelling wave does not actually propagate during the first time slot T1, but only during the seven subsequent time slots T2-T8). One seventh corresponds to about 14% of the X-dimension of the transceiver field, i.e. to a spatial interval of $(1/7)*3.0 \approx 0.43$. Accordingly, the secondary transceivers listed in column T2 of the wave table of FIG. 2A may have an estimated X-coordinate in the range of 0-00.43, while the secondary transceivers listed in column T3 may have an estimated X-coordinate in the range of 0.43-0.86, etc.

It will be clear that estimates of the Y-coordinates of the secondary transceivers 201-250 may be obtained in much the same way as estimates of their X-coordinates, in particular by generating a travelling wave that travels in the positive Y-direction instead of in the positive X-direction. To this end, the primary transceiver 100 may initiate a second wave-routine by sending an identification command to a selected initial secondary transceiver that may be expected to set off a travelling wave that propagates substantially in the positive Y-direction, such as initial secondary transceiver 251. A wave table recorded during such a second wave-routine is shown in FIG. 2C.

As discussed above, a travelling wave may be set off by a single initial secondary transceiver, e.g. initial secondary transceiver 253 or 251. In such a case, a wave front of the travelling wave—i.e. all secondary transceivers 201-254 that, during some time slot T, transmit their identification codes to the primary transceiver 100 and retransmit the identification command to their neighbors—may at first be relatively curved or chaotic, and, as the travelling wave propagates and develops, straighten gradually. This phenomenon, which may be visualized in FIG. 1 by each time interconnecting all secondary transceivers 201-254 listed in respective consecutive time slots T of the respective wave tables of FIGS. 2A-B, may be employed to increase the accuracy with which the positions of the respective secondary transceivers 201-254 within the transceiver field 300 may be determined. This is because the secondary transceivers 201-254 that constitute a generally straight wave front are substantially aligned in space. Hence, a wave table time slot T during which the identification codes of secondary transceivers 201-254 forming a generally straight wave front are recorded may be linked to a narrower spatial coordinate range (or to narrower spatial coordinate ranges) than a time slot T during which the identification codes of secondary transceivers 201-254 forming a substantially curved wave front are recorded (in the latter case, the possible variation or spread in coordinate values is larger). Accordingly, the estimates of the X- and Y-coordinates may be improved by giving data from time slots T relating to substantially straight wave fronts more weight that data from time slots T relating to non-straight wave fronts.

As a practical rule of thumb, time slots T may be considered to relate to substantially straight wave fronts if they cover a time span in the second half of the wave period, i.e. the period it takes a travelling wave to travel across the transceiver field. Or phrased otherwise: time slots T in the second half/on the left-hand side of a wave table, e.g. time slots T5-T8 in FIG. 2A, may generally be considered to relate to developed travelling waves with a substantially linear wave front. Since, according to the aforementioned rule of thumb, calculation of accurate estimates of X- and/or Y-coordinates may preferably be based on data from the second half of a wave table instead of the first half, a setup-routine may preferably include multiple wave-routines, in particular two wave-routines per dimension or independent spatial coordinate X, Y to be determined. The two wave-routines associated with a single dimension, e.g. the X-dimension or the Y-dimension, may preferably involve travelling waves that propagate in opposite directions, such that the two resulting wave tables associated with a single dimension include substantially complementary second halves.

For example, two wave-routines associated with the X-dimension may preferably involve travelling waves that propagate in the positive and negative X-directions, respectively. As already seen above, a travelling wave propagating in the positive X-direction, i.e. from the left edge 300c of the transceiver field 300 to the right edge 300d thereof, may be initiated by first sending the identification command to initial secondary transceiver 253, positioned at about halfway the left edge 300c. Similarly, a travelling wave propagating in the negative X-direction, i.e. from right edge 300d of the transceiver field 300 to left edge 300c thereof, may be initiated by first sending the identification command to initial secondary transceiver 254, positioned at about halfway the right edge 300d. Likewise, travelling waves propagating in the positive and negative Y-directions may be initiated by first sending the identification command to initial secondary transceivers 251 and 254, respectively. Overall, a setup-routine aimed at determining accurate estimates of the X- and Y-coordinates of the secondary transceivers 201-250 in the situation illustrated in FIG. 1 may thus comprise four wave-routines, each of which may result in a single wave table. The four wave tables associated with travelling waves propagating in the positive X-direction, the positive Y-direction, the negative X-direction and the negative Y-direction are shown in FIGS. 2A, 2C, 2B and 2D, respectively.

To obtain accurate estimates for the X-coordinates of the secondary transceivers 201-250, the data of the wave tables shown in FIGS. 2A and 2B may be combined. In this combination, data from the time slots T1-T4 (assumed to relate to non-straight wave fronts) may be assigned a weighting factor that is less than the weighting factor that may be assigned to data from the time slots T5-T8 (assumed to relate to straight wave fronts). Data in the time slots T1-T4 may, for example be assigned a weighting factor 0.45, while data in the time slots T5-T8 may be assigned a weighting factor 1.55. Then the weighted average of the data in the two tables may be calculated.

For example, the estimated X-coordinate of secondary transceiver 30 may be calculated as follows. In the wave table of FIG. 2A, the identification code of secondary transceiver 230 is recorded in time slot T7. As discussed above, time slot T7 in FIG. 2A may be associated with an X-coordinate range from $(7-2)*(1/7)*3.0$ to $(7-1)*(1/7)*3.0$, i.e. from approximately 2.14 to 2.57, and hence with an average X-coordinate of approximately $(2.14+2.57)/2=2.35$, and with a weighting factor 1.55. In the wave table of FIG. 2B, the identification code of secondary transceiver 230 is recorded in time slot T2. This time slot T2 may be associated with an X-coordinate range from $3.0-((2-1)*(1/6)*3)$ to $3.0-((2-2)*(1/6)*3.0)$, i.e. from 2.5 to 3, and hence with an average X-coordinate of approximately $(2.5+3)/2=2.75$ and a weighting factor of 0.55. The weighted average of the X-coordinate of secondary transceiver 230 may thus be calculated as $(1.55*2.35+0.45*2.75)/2=4.88/2=2.44$. Estimates for the X-coordinates of the other secondary transceivers 201-229, 231-254 may be calculated from the wave tables of FIGS. 2A and 2B in the same way, and estimates for the Y-coordinates of the secondary transceivers 201-250 may be calculated similarly from the wave tables of FIGS. 2C and 2D.

From the calculated estimates, a position map may be constructed, in particular during a secondary transceiver mapping routine that forms part of the setup-routine. In this context, a position map may be construed to be any data structure that relates the identification codes of the secondary transceivers 201-254 to the respective (estimated) spatial coordinates of these secondary transceivers, and/or vice versa. The position map may preferably be set up such that that a certain spatial coordinate range is immediately linked to the identification codes of the secondary transceivers having a spatial coordinate within that range. See for example the position map shown in FIG. 3, which comprises two sub-position maps, one for the X-coordinates of the secondary transceivers 201-254 (FIG. 3A) and one of the Y-coordinates of the secondary transceivers 201-254 (FIG. 3B). From the position map of FIG. 3, is may readily be derived that, within the (X, Y) coordinate range (0.90-1.20, 1.20-1.50) two secondary transceivers are present, namely secondary transceivers 216 and 223.

Since the secondary transceivers 201-254 may have time-variable positions, it may be desirable to periodically (re-) execute the setup-routine in order to keep the position map up-to-date during operation of the system 1.

Once an (up-to-date) position map has been constructed by the primary transceiver 100, it may initiate an action routine. During the action routine, the primary transceiver 100 may select at least one secondary transceiver, present within the transceiver field 300, and discriminately, typically long-range transmit to it an action command. The action command may hold instructions for the secondary transceiver to activate the action means. In case the secondary transceivers 201-254 are fitted with audio and/or visual means, for instance, the action command may hold instructions for the processing unit of the addressed secondary transceiver 201-254 to have the audio means produce a sound, for example of a certain pitch and/or for a certain duration, and/or to have the visual means emit light, for example of a certain color or certain colors, possibly according to a certain brightness pattern, and for a certain duration.

It will be clear that the primary transceiver 100, based on the information in the position map, may send action commands to secondary transceivers 201-254 that are selected for their positions in the transceiver field 300. Accordingly, the primary transceiver 100 may select a certain temporal/spatial-pattern of secondary transceivers 201-254, and send action commands to these selected secondary transceivers to create a desired static or dynamic effect. The primary transceiver 100 may, for instance, effect a dynamic sound or light wave that travels from left to right through the transceiver field 300 by sequentially transmitting action commands to secondary transceivers 201-254 with increasing spatial X-coordinates. Alternatively, the primary transceiver 100 may consider the secondary transceivers 201-254 in the transceiver field to form the pixels of a video screen, and thus project entire (video)images onto the transceiver field 300. In case the secondary transceivers are equipped with audio means, the (video)images may be accompanied by sound.

Second Embodiment

In the above-described first primary embodiment, the secondary transceivers 201-254 are fitted with predetermined identification codes, which may be collected and sorted in wave tables by the primary transceiver 100 during the setup-routine, and then linked to a spatial position within the transceiver field 300. In that case, it is preferred that the secondary transceivers transmit their identification codes to the primary receiver 100.

It is not necessary, however, for the secondary transceivers 201-250 to have been assigned a respective unique identification code before the system 1 comes into operation. In fact, it may be preferred to first assign position-related identification codes to the secondary transceivers 201-250 during the setup-routine, in particular to reduce the number of power-consuming transmissions to be effected by the secondary transceivers. This is precisely what happens in a second, alternative primary embodiment of the present invention that is elucidated below. In this case, the secondary transceivers do not transmit identification codes to the primary receiver.

When a system 1 that is configured to operate according to the second primary embodiment comes into operation, it too may first execute a setup-routine. The setup-routine may typically be initiated by the primary transceiver 100, but—unlike the first primary embodiment described above—the primary transceiver 100 may not take stock of the (identification codes of the) secondary transceivers 201-250 present in the transceiver field 300. Instead, it may initiate one or more wave-routines in which identification codes, corresponding to location-related or spatial coordinates, are assigned to the respective secondary transceivers 201-250. That is, each assigned identification code may reflect the spatial position of the respective transceiver 201-254 within the transceiver field 300. For instance, in case the transceiver field is x-dimensional, an identification code may comprise x coordinates; thus two coordinates for a two-dimensional transceiver field, etc. The identification codes assigned to the secondary transceivers 201-250 may be stored in their respective memories for later use in an action routine, similar to the action routine described above in relation to the first primary embodiment.

As mentioned, the setup-routine may include a wave-routine. In a typical embodiment, the setup-routine may include multiple wave-routines, namely at least one wave-routine per dimension or independent coordinate to be assigned to each secondary transceiver 201-250 as part of its identification code, and in a preferred embodiment, the setup-routine may include two wave-routines per dimension or independent coordinate to be assigned to each secondary transceiver 201-254 as part of its identification code. Similar to the first primary embodiment, the use of two wave-routines per dimension enables assignment of location-related identification codes of greater accuracy to the secondary transceivers 201-250 than possible with one wave-routine per dimension. In general, in case the setup-routine includes it wave-routines per dimension, a secondary transceiver's identification code may include it coordinate slots per dimension. For instance, in case the setup-routine includes two wave-routines per dimension, and the transceiver field 300 is two-dimensional such that positions within the field are determined by two coordinates x, y, an identification code may include four coordinate slots, x1, x2, y1, y2. The different coordinate slots for a same dimension, e.g. slots x1, x2 for the x-dimension and slots y1, y2 for the y-dimension, may serve to store alternative coordinate values, one of which may eventually be used as the actual, preferred value. Note that the use of multiple coordinate slots per dimension in this second primary embodiment is similar to the use of multiple wave tables per dimension in the first primary embodiment.

Each wave-routine may entail the constitution of a travelling wave, which travelling wave may be initiated by the primary transceiver 100 and then perpetuated by the secondary transceivers 201-250. To initiate a travelling wave, the primary transceiver 100 may have a respective one of its fixed, strategically positioned transceivers 251-254 short-range transmit a cascading identification command indiscriminately to a neighboring secondary transceiver 201-250 The identification command may hold instructions for the secondary transceiver to:

i. to store an iteration number of the received identification command in (a coordinate slot in) its memory as part of its unique identification code; and to short-range retransmit the identification command with an incremented iteration number, indiscriminately neighboring secondary receivers, preferably under the condition that no such retransmission of the identification command was effected during a wave period $t_{wave\_period}$ immediately preceding reception of the identification command by the secondary transceiver, so as to effect a travelling wave of secondary transceivers retransmitting the identification command.

The process effected by the transmission of the identification command may be elucidated as follows.

Once a secondary transceiver 201-254 receives the identification command, it will execute it by storing the iteration number of the received command in a coordinate slot in a memory, as part of its unique identification code. The iteration number of the identification command may reflect the number of times that the identification command has been retransmitted; accordingly, the primary transceiver 100 may typically transmit an identification command with an iteration number 0. Subsequently, the secondary transceiver may prepare a modified copy of the identification command having an incremented iteration number, e.g. the iteration number of the identification command receiver +1, and short-range retransmit it indiscriminately to neighboring secondary transceivers. In case the identification command so specifies, the retransmission of the identification command may be effected after a certain, optionally secondary transceiver-specific, randomizer delay.

It will be clear that the initial transmission of the identification command by the primary transceiver 100 brings about a travelling wave of secondary transceivers retransmitting the identification command, wherein the iteration number of the identification command is incremented upon each retransmission. Accordingly, increasing iteration numbers are assigned to the coordinate slots of the identification codes of secondary transceivers 201-254 as the travelling wave travels.

In practice a setup-routine including multiple wave-routines may involve the following. Assume, for example, that the transceiver field 300 is two-dimensional, and that the setup-routine includes two wave-routines per dimension. A total of four wave-routines may then be executed during the setup-routine. As in the first primary embodiment described above, each wave routine may be associated with a travelling wave in a certain direction. That is, the first, second, third and fourth wave-routines may be initiated via strategically positioned transceivers 253, 251, 254, 252 of the primary transceiver 100, respectively, and thus involve travelling waves that travel through the transceiver field 300 substantially in, respectively, the positive X-direction, the positive Y-direction, the negative X-direction and the negative Y-direction. It will be clear that the order in which the wave-routines are initiated is in itself immaterial, as long as the order is determined and known to the secondary transceivers 201-254, so these secondary transceivers may fill the coordinate slots of their identification codes with iteration numbers in the corresponding order. In the stated order of wave-routines, for instance, the order in which the coordinate slots may be filled may be x1, y1, x2, y2, such that coordinate slot x1 holds iteration numbers relating to the travelling wave travelling in the positive X-direction, while coordinate slot x2 holds iteration numbers relating to the travelling wave travelling in the negative X-direction, etc.

When all four wave-routines of the setup-routine have been executed, all coordinate slots of the identification codes of the secondary transceivers are filled. Each identification code now comprises two iteration numbers/coordinate values per dimension. It should be noted that these two iteration numbers/coordinate values per dimensions may typically be complements of each other, since they may be associated with travelling waves travelling in opposite directions. In much the same way as with the use of multiple wave tables per dimension in the first primary embodiment, the iteration numbers/coordinate values associated with substantially straight wave fronts may be most accurate.

To ensure the use of iteration numbers/coordinate values associated with substantially straight wave fronts, the primary transceiver 100 may, upon completion of the wave-routines, determine the maximum iteration numbers/coordinate values assigned in each dimension. These maximum iteration numbers may be readily available to the primary transceiver 100, since its transceivers 251-254 may be located at the edges 300a-d of the transceiver field 300 where travelling waves come to a dead end. Transceiver 254, for example, may receive the last retransmissions of the identification command transmitted by the secondary transceivers 201-254 during a travelling wave in the positive X-direction. Accordingly, the maximum iteration number/coordinate value assigned for the X-dimension may be known to the primary transceiver. The same applies to the Y-dimension. The primary transceiver 100 may thus transmit a command to all secondary transceivers 201-250 to determine which of the iteration numbers/coordinate values recorded for each respective dimension is effectively the largest, and to ignore, for the respective dimension, coordinate values below half the maximum iteration number/ coordinate value determined for the respective dimension (thereby taking account of the complementary nature of the different iteration numbers/coordinate values per dimension), so as to use only those iteration numbers/coordinate values associated with the second half of a travelling wave, i.e. the half of a wave presumed to have a straight wave front. —In case the maximum iteration numbers are not known to the primary transceiver 100 upon completion of the wave routines, the primary transceiver may estimate them, or, for instance, indiscriminately transmit commands to the secondary transceivers 201-254 to transmit to it their current identification codes, so as to enable it to determine the maximum iteration numbers from the received identification codes.

Once all secondary transceivers 201-250 have thus been assigned position-related identification codes, and the primary transceiver 100 is aware of the maximum coordinate values for each dimension, the primary transceiver 100 may initiate an action routine is a manner similar to that described above with reference to the first primary embodiment. For example, in case the maximum iteration numbers associated with the X- and Y-dimensions are, respectively, p and q, a field of p×q secondary transceivers 201-250 is available. A secondary transceiver with the identification code (x,y)=(0, 0) may be found in a first corner of the transceiver field 300, while a secondary transceiver with the identification code (x,y)=(p,q) may be found in a second, opposite corner thereof. Hence, the primary transceiver 100 may discriminately transmit action commands to each of the secondary transceivers, selected for its position within the transceiver field 300.

Although the present invention has applications in the field of crowd entertainment, as mentioned above, it is certainly not limited thereto. Another application, for instance, includes the tracking of inventory objects, either for logistical or security reasons (e.g. anti-theft), wherein the objects to be tracked are marked with secondary transceivers.

For example, the invention may be used to map or estimate locations of afore mentioned secondary transceivers in any area or space that may include such transceivers, for example a supermarket, store, shop, warehouse, etc. It is not required that action commands are transmitted to secondary transceivers, by a said primary transceiver. For example, in case a primary transceiver has obtained information concerning the position, or estimated position, of one or more secondary transceivers, the primary transceiver may be configured to send one or more action commands to optional action devices (e.g. information providers, displays, sound generators or the-like) that may be located at or near or in the aeeathe respective secondary transceivers.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 system of primary and secondary transceivers
100 primary transceiver
201-250 mobile secondary transceiver 201-250
251-254 initial, positionally fixed secondary transceivers 251-154 (first primary embodiment); positionally fixed transceivers that form part of the primary transceiver 100 (secondary primary embodiment)
300 transceiver field
300a,b,c,d first/lower (a), second/upper (b), third/left (c) and fourth/right (d) edge of transceiver field
t clock time
$t_{rand\_delay}$ secondary transceiver-specific randomizer delay
$t_{time\_slot\_delay}$ time slot delay
$t_{wave\_period}$ wave period
T time slot
T1, 2, 3, . . . time slot number 1, 2, 3, . . . ; TQ covers the time interval from $t=(Q-1)*t_{time\_slot\_delay}$ and $t=Q*t_{time\_slot\_delay}$

We claim:

1. A method comprising:
providing a primary transceiver;
providing a plurality of secondary transceivers, spatially distributed throughout a transceiver field, each secondary transceiver including:
a transmitter;
a receiver;
a memory for holding a unique identification code; and
a processing unit, operably connected to the transmitter, the receiver and the memory, and configured to execute commands received via the receiver;
executing a setup-routine, said setup-routine comprising a wave-routine including:
the primary transceiver transmitting a cascading identification command to at least one initial secondary transceiver of the plurality of secondary transceivers, wherein the identification command holds instruction the secondary transceiver to short-range retransmit a same or modified copy of the identification command indiscriminately to neighboring secondary receivers, provided no such retransmission of the identification command was effected during a wave period immediately preceding reception of the identification command by the secondary transceiver, so as to effect a travelling wave of the plurality of secondary transceivers retransmitting the identification command.

2. The method according to claim 1, wherein the memory of each secondary transceiver holds a predetermined unique identification code.

3. The method according to claim 1, wherein the identification command holds instructions for the secondary transceiver
to long-range transmit its identification code to the primary transceiver, and
short-range retransmit the identification command indiscriminately to the neighboring secondary receivers after a certain time slot delay;
and wherein the wave-routine further includes:
the primary transceiver recording, in a wave table, the identification codes being received during consecutive time slots, each of which time slots (T) covers a time interval corresponding to the time slot delay.

4. The method according to claim 3, wherein the identification command's instruction for the secondary transceiver to long-range transmit its identification code to the primary transceiver includes the instruction to do so after a certain secondary transceiver-specific randomizer delay.

5. The method according to claim 4, wherein the randomizer delay is smaller than the time-slot delay, and wherein the time-slot delay is smaller than the wave period.

6. The method according to claim 1, wherein the identification command holds instructions for the secondary transceiver
to store an iteration number of the received identification command in its memory as part of its unique identification code;
to short-range retransmit the identification command with an incremented iteration number, particularly without long-range transmitting its identification. code.

7. The method according to claim 1, wherein the setup-routine includes multiple wave-routines associated with different initial secondary transceivers.

8. The method according to claim 7, wherein the transceiver field is associated with two, mutually perpendicular geometric axes ($L_x, L_y$), and
wherein the setup-routine includes two wave-routines associated with the different initial secondary transceivers that, during execution of the cascading identification command, effect travelling waves having respective generally straight wave fronts, which wave fronts travel in opposite directions along one of said geometric axes.

9. The method according to claim 8, wherein the setup-routine includes another two wave-routines associated with the different initial secondary transceivers that, during executing of the cascading identification command, effect travelling waves having respective generally straight wave fronts, which wave fronts travel in opposite directions along the other of said geometric axes.

10. The method according to claim 7, wherein at least one of the initial secondary transceivers has a fixed, predetermined position in the transceiver field, along a circumference of the transceiver field.

11. The method according to claim 7, wherein the setup-routine further comprises a secondary transceiver mapping-routine, including:
composing a position map of the different initial secondary transceivers within the transceiver field, based on data from an obtained wave tables.

12. The method according to claim 11, wherein identification codes received during a plurality of early consecutive time slots (T1, T2, T3, . . . ) in each of said wave tables are discarded in composing the position map.

13. The method according to claim 7, wherein the primary transceiver includes a plurality of transceivers that have a fixed, predetermined position in the transceiver field, along a circumference of the transceiver field.

14. The method according to claim 1, the method further including:
executing an action-routine, in which the primary transceiver interacts with at least one of the secondary transceivers, selected for its position within the transceiver field, by sending it an action command.

15. The method according to claim 14, wherein the secondary transceivers further include audiovisual communication means that are operably connected to the processing unit, and
wherein the action-routine includes:
the primary transceiver determining a desired spatial audio or visual pattern, and transmitting an action command to at least one secondary transceiver that is selected based on (i) said spatial audio or visual pattern and (ii) either a composed position map or its identification code, wherein the action command holds instructions for the secondary transceiver to activate or deactivate the audio or visual communication means, so as to effect the desired spatial audio or visual pattern within the transceiver field.

16. A system, particularly for carrying out a method according to claim 1, the system including:
a primary transceiver;
a plurality of secondary transceivers, configured to be spatially distributed throughout a transceiver field, each secondary transceiver including:
a transmitter;
a receiver;
a memory for holding a unique identification code; and
a processing unit, operably connected to the transmitter, the receiver and the memory, and configured to execute commands received via the receiver;
the primary transceiver being configured to transmit a cascading identification command to at least one initial secondary transceiver of the plurality of secondary transceivers, wherein the identification command holds instructions for the secondary transceiver to short-range retransmit a same or modified copy of the identification command indiscriminately to neighboring secondary receivers, provided no such retransmission of the identification command was effected during a wave period immediately preceding reception of the identification command by the secondary transceiver, so as to effect a travelling wave of the plurality of secondary transceivers retransmitting the identification command.

17. The system according to claim 16, wherein the primary transceiver and at least one of the plurality of secondary transceivers are configured to execute an action-routine, in which the primary transceiver interacts with the at least one of the secondary transceivers, selected for its position within the transceiver field, by sending it an action command.

18. A system according to claim 16, wherein the primary transceiver is a consumer electronics device.

19. A system according to claim 16, wherein the secondary transceiver is a consumer electronics device.

* * * * *

UNITED STATES PATENT AND TRADEMARK OFFICE
CERTIFICATE OF CORRECTION

PATENT NO.         : 9,664,774 B2
APPLICATION NO.    : 14/432055
DATED              : May 30, 2017
INVENTOR(S)        : Snel et al.

It is certified that error appears in the above-identified patent and that said Letters Patent is hereby corrected as shown below:

In Column 18, Line 43-44, in Claim 1, delete "instruction" and insert --instructions for-- therefor In Column 18, Line 62, in Claim 3, before "short-range", insert --to--

In Column 19, Line 19, in Claim 6, delete "identification." and insert --identification-- therefor In Column 19, Line 25, in Claim 8, delete "($L_x$,$L_y$)," and insert --($L_x$, $L_y$),-- therefor Signed and Sealed this
Ninth Day of October, 2018

Andrei Iancu
*Director of the United States Patent and Trademark Office*